United States Patent [19]

Nagata et al.

[11] Patent Number: 5,233,292
[45] Date of Patent: Aug. 3, 1993

[54] SPEED DETECTOR DEVICE FOR ELEVATOR

[75] Inventors: Yasuhiro Nagata; Junichi Tanino, both of Inazawa, Japan

[73] Assignee: Mitsubishi Denki Kabushiki Kaisha, Tokyo, Japan

[21] Appl. No.: 886,233

[22] Filed: May 21, 1992

[30] Foreign Application Priority Data

May 22, 1991 [JP] Japan ................... 3-116417

[51] Int. Cl.$^5$ .............. G01P 3/48; G01P 3/54
[52] U.S. Cl. .................. 324/166; 364/565
[58] Field of Search ............ 324/160, 166; 377/19; 364/551, 565

[56] References Cited

FOREIGN PATENT DOCUMENTS 61-259172 11/1986 Japan .

Primary Examiner—Walter E. Snow
Attorney, Agent, or Firm—Leydig, Voit & Mayer

[57] ABSTRACT

A speed detector device capable of making speed measurements of an elevator in its relatively slow speed region comprises a pulse generator generating two-phase pulse signals with a predetermined phase difference between both signals, in a period according to the rotational speed of a motor, a pulse processing circuit for outputting corresponding triggers in response to the rising edge and the falling edge of each of the pulse signals generated by the pulse generator, a timer counter, latches for latching the output of the timer counter at the timing of the triggers, and calculating circuit for calculating the period of the pulse signals based on the timer counter output and for calculating the speed of the elevator based on the period calculated. The above arrangement allows data to be latched not only at the rising edge of the one pulse signal, but also at the falling edge of the same pulse signal and the rising and falling edges of the other pulse. Thus, even if no rising edge exists during a CPU read cycle, speed detection is possible at the other rising edges. Thus, accurate speed measurements are achieved.

6 Claims, 5 Drawing Sheets

SPEED DETECTOR DEVICE FOR ELEVATOR

BACKGROUND OF THE INVENTION

1. Field of the Invention

The present invention relates to a device which makes accurate measurements of speed of an elevator when it is moving in a relatively slow speed.

2. Description of the Related Art

An elevator controller 1 shown in FIG. 4 comprises a CPU 2, a ROM 3, a RAM 4, an interface circuit 5 for input and output signals, and a speed detector circuit 6. Also shown in FIG. 4 are a motor 7, an elevator box 8, a counter-weight 9, and a pulse generator 10 which generates, depending on the rotation of the motor 7, two kinds of pulses 90° apart in phase with each other, i.e., A phase and B phase pulses.

FIG. 5 is a more detailed diagram of the speed detector circuit 6. FIG. 5 shows A phase pulse 10a, B phase pulse 10b, an up/down counter 11 which counts rising edges of the pulse 10a, a direction discriminator 12 which identifies the direction of travel of an elevator from the A phase pulse 10a and the B phase pulse 10b, a timer counter 13 which measures time by counting an external clock signal, latch circuits 14 and 15 arranged to the output of the timer counter 13, gate circuits 16 and 17 arranged respectively to each output of the up/down counter 11 and the latch circuit 15, and a data bus 18 for the CPU 2.

Referring now to FIG. 6 and FIG. 7, the operation of this prior art is described below. When the elevator box 8 begins moving, i.e., the motor 7 is put into motion, the pulse generator 10 outputs the A phase pulse 10a and the B phase pulse 10b, both of which are 90° apart with each other, in accordance with the rotation of the motor 7. Each of these pulses is fed to the speed detector circuit 6 in the elevator controller 1. Receiving data from the speed detector circuit 6, the CPU 2 computes the travel speed of the elevator box 8 as described below, according to a predetermined program.

Two phase pulses, 10a and 10b, fed to the speed detector circuit 6 are input to the direction discriminator 12, where the direction of travel of the elevator is determined. The speed detector circuit 6 outputs up/down signal 12a which indicates the direction of travel of the elevator. The up/down counter 11 is driven by the up/down signal 12a and the rising edge of the pulse 10a. The timer counter 13 normally counts up a predetermined clock signal CLK, and the latch circuit 14 latches the count of the timer counter 13 at the timing of each rising edge of the A phase pulse 10a. An example of the time chart of this operation is illustrated in FIG. 6.

Since each of the A phase pulse 10a and the B phase pulse 10b is provided by the pulse generator 10 in response to the rotation of the motor 7, a distance of travel L of the elevator box 8 per pulse may be defined. The up/down counter 11 counts up or down at the timing of each rising edge of the A phase pulse, i.e., at time a, time b and time c. Assuming that the count is m at time a with the counter counting up, the count should be m+1 and m+2 at time b and time c, respectively. The timer counter 13 latches, at the timings of a, b and c, its counts (respectively designated x, y and z) into the latch 14.

The description that follows is how the CPU 2 determines the speed of the elevator. The CPU 2 normally performs its task according to a predetermined arithmetic cycle. The CPU read cycle, during which the count of the up/down counter 11 and the count of the timer counter 13 are read, and which is represented by a duration from d to e in FIG. 5, is substantially constant. When the CPU 2 is reading data at time d and time e as shown in FIG. 6, the count of the up/down counter 11 is m at time d, and m+2 at time e. The distance of travel X of the elevator box 8 is expressed by the following equation.

$$X = \{(m+2) - m\} \times L = 2L \quad (1)$$

An elapsed time T required for the distance of travel X is expressed as follows:

$$T = (z - x)t \quad (2)$$

where t represents the period of the clock signal CLK. The speed of the elevator box 8, i.e., the speed V of the elevator is given as follows:

$$V = 2L/(z-x)t \quad (3)$$

When the speed is increased, the number of pulse count of the A phase pulse increases during the duration from time d to time e, the same process is also applicable to determine the speed.

The count of the timer counter 13 is latched at the timing when data is read from the up/down counter 11 by outputting read signal RDOL. This is for the purpose of retaining the count of the timer counter 13 at the timing of read. Therefore, read operation is performed at time d in FIG. 6, the reading of the count x of the timer counter 13, corresponding to the count m of the up/down counter 11, is reliably done.

Conventional elevator speed detector devices are constructed as described above. When the speed of travel of the elevator is slowed down, the number of rising edges of the A phase pulse included in the predetermined duration of CPU data read cycle are decreasing, possibly leading to no rising edge state. In such a slow travelling speed region, when a rising edge such as P1 in FIG. 7 takes place immediately after the CPU reading operation, its detection may be delayed for a duration corresponding to one data read cycle. When no rising edge takes place as illustrated by P2 in FIG. 7, no change occurs during the data read cycle, thereby no accurate speed measurements are made throughout this period.

SUMMARY OF THE INVENTION

The present invention has been developed with a view to substantially solving the above described disadvantage and has an object to provide a elevator speed detector device capable of making more accurately speed measurements in a relatively slow speed region.

The elevator speed detector device, according to the present invention, capable of making speed measurements of an elevator in its relatively slow speed region, comprises a pulse generator generating two phase pulse signals with a predetermined phase difference between both signals, in a period in accordance with the rotational speed of a motor, a pulse processing circuit for outputting corresponding triggers in response to the rising edges and the falling edges of each pulse signal generated by the pulse generator, a timer counter for counting time, latch means for latching the output of the timer counter at the timing of the triggers provided by the pulse processing circuit, and calculating means for calculating the period of the pulse signals based on the timer counter output latched by the latch means at the timing of the triggers derived from the pulse signal of the same phase and, at the same time, for calculating the speed of the elevator based on the period calculated.

DESCRIPTION OF THE PREFERRED EMBODIMENT

Figure 1:
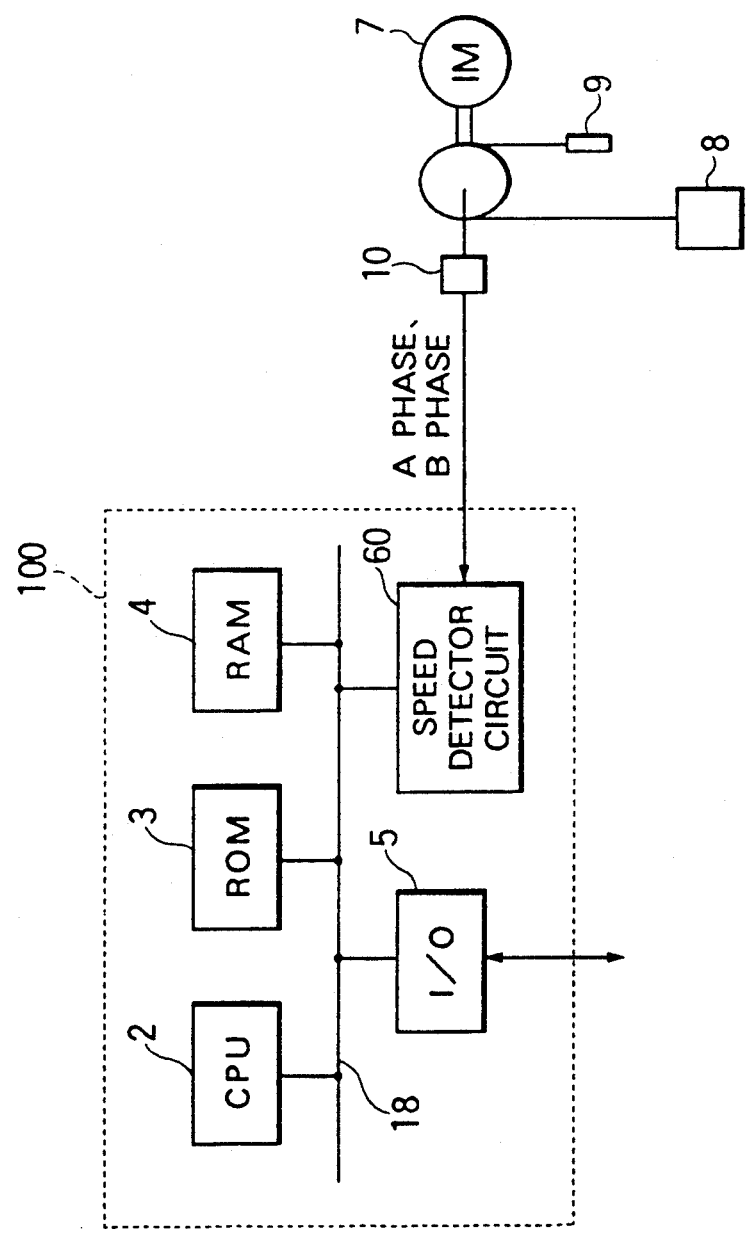
FIG. 1 is a block diagram showing an elevator controller having an elevator speed detector device according to the present invention.

Referring now to the drawings, the embodiment of the present invention is described below.

In FIG. 1, a pulse generator 10 is connected to a motor 7 which drives an elevator box 8 and a counterweight 9. Connected to the pulse generator 10 is a speed detector circuit 60 contained in an elevator controller 100. The elevator controller 100 further contains a CPU 2, a ROM 3, a RAM 4 and an interface circuit 5. A data bus 18 makes interconnections between the CPU 2, the ROM 3, the RAM 4, the interface circuit 5 and the speed detector circuit 60.

Figure 2:
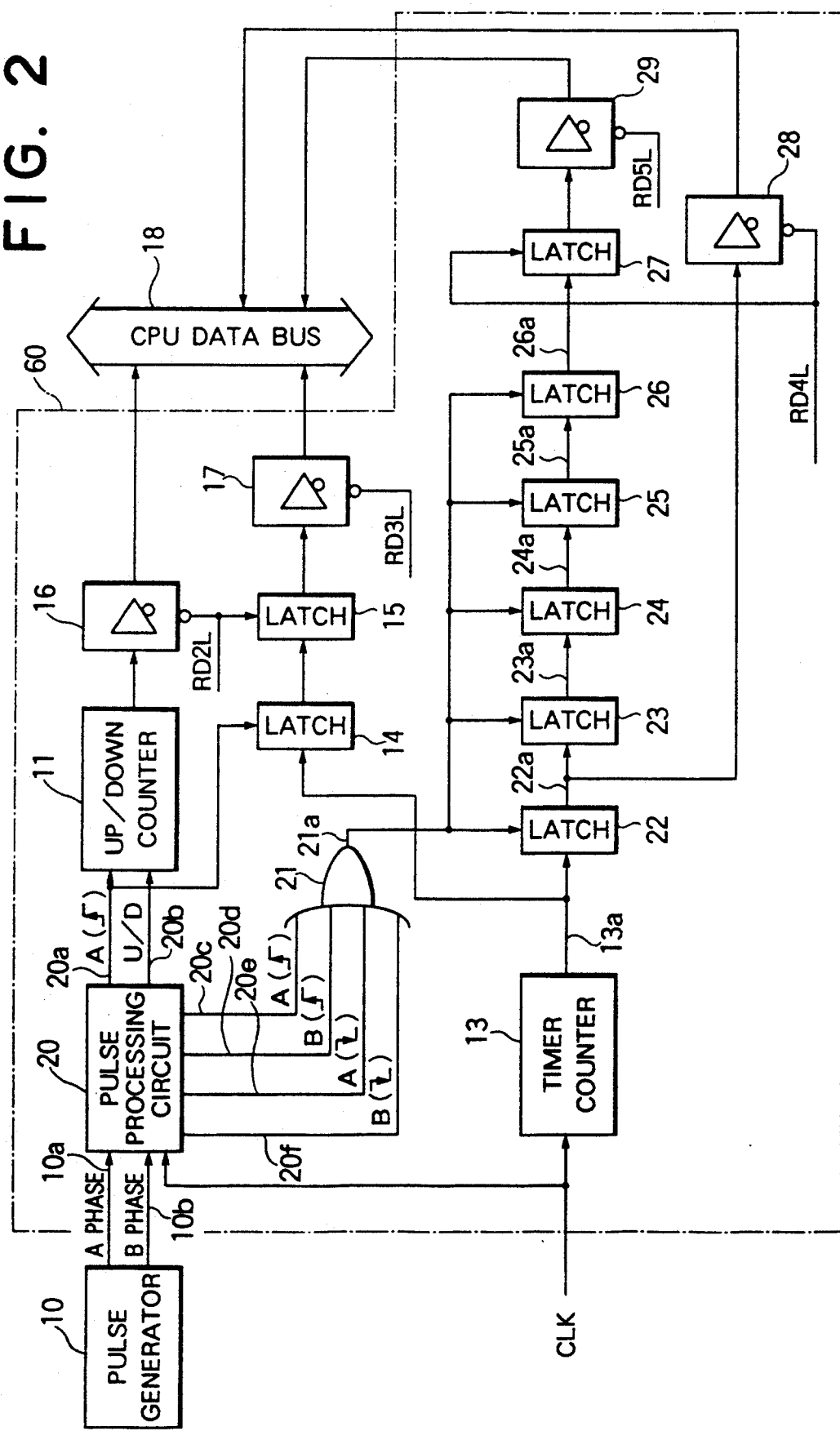
FIG. 2 is a block diagram showing detailed arrangement of a speed detector circuit.

FIG. 2 shows the detailed internal arrangement of the speed detector circuit 60. The pulse generator 10 connects to an up/down counter 11 via a pulse processing circuit 20. The up/down counter 11 connects to the data bus 18 via a gate circuit 16. A timer counter 13 connects to latch circuits 22 through 27 arranged in series connection. The latch circuit 27 connects to the data bus 18 via a gate circuit 29. Both the pulse processing circuit 20 and the timer counter 13 are connected to a latch circuit 14, which, in turn, is connected to the data bus 18 via a latch circuit 15 and then a gate circuit 17. An OR gate circuit 21 is arranged between the pulse processing circuit 20 and each of the latch circuits 22 through 26. The latch circuit 22 connects to the data bus 18 via a gate circuit 28.

The description that follows is how the embodiment operates. The pulse generator 10 provides the pulse processing circuit 20 in the speed detector circuit 60 with an A phase pulse 10a and a B phase pulse 10b, both of which are 90° apart in phase with each other, in accordance with the rotation of the motor 7. An output signal 20a given by the pulse processing circuit 20 is identical to the A phase pulse 10a, while an output signal 20b is an up/down signal, derived from both the A phase pulse signal 10a and the B phase pulse signal 10b and is indicative of the direction of travel of the elevator. The up/down counter 11 is driven by the signals 20a and 20b, and the output 13a of the timer counter 13 is latched into the latch circuit 14 at the timing of the rising edge of the A phase pulse signal 10a, i.e., 20a.

In normal operating conditions, the output of the latch circuit 14 is latched into the latch circuit 15 at the same timing as the output of the up/down counter 11 is read at a read pulse RD2L, and, further, the data of the latch 15 is read at the timing of a read pulse RD3L. The calculation of the elevator speed is performed in the same manner as in the conventional device.

Figure 3:
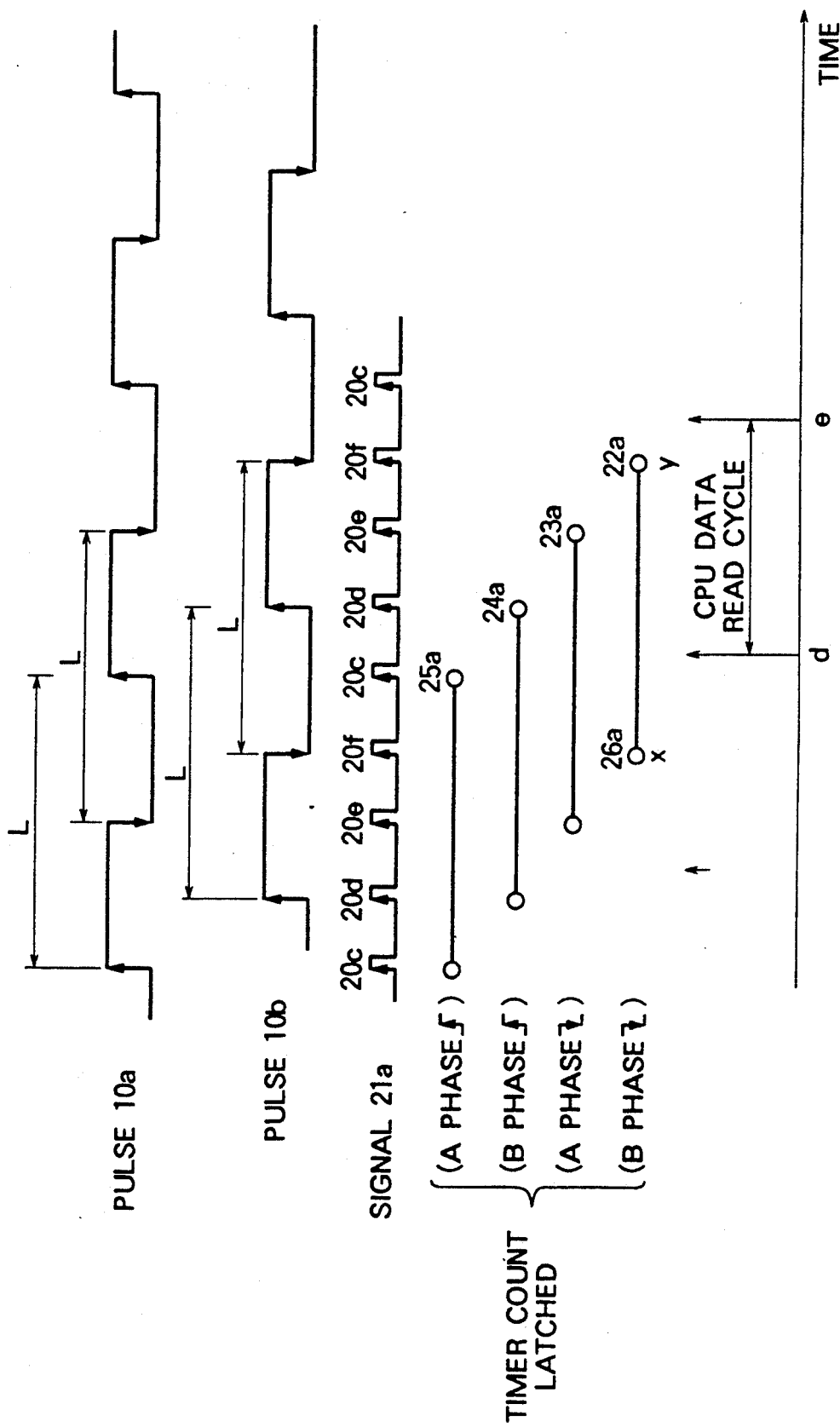
FIG. 3 is a time chart showing the operation of the speed detector circuit.
Figure 4:
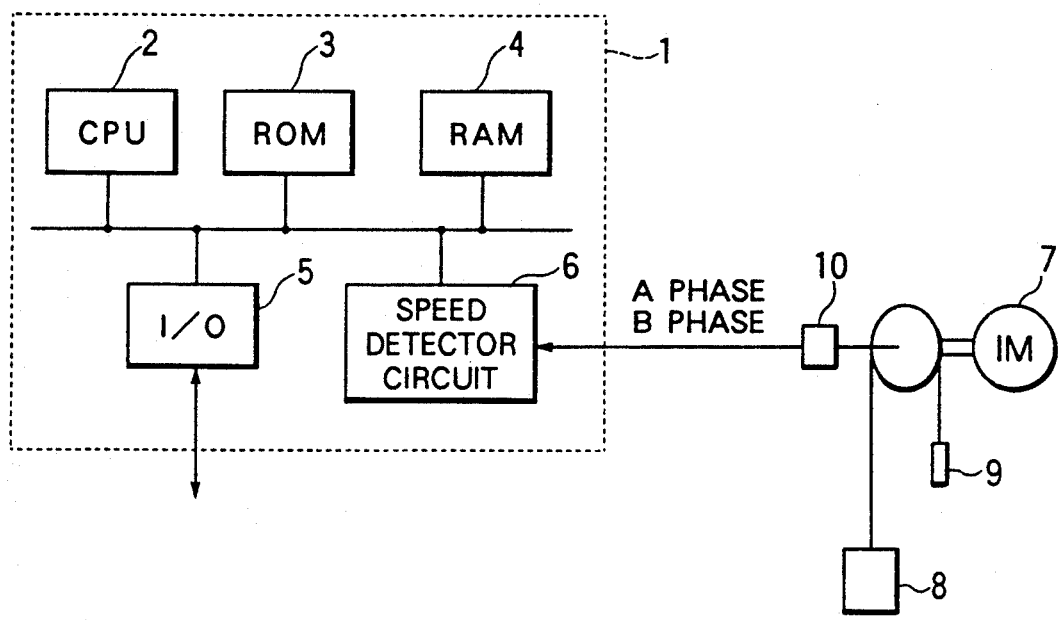
FIG. 4 is a block diagram showing a conventional elevator controller.

The description that follows is how the speed is detected when the elevator is moving in a relatively low speed. Signals 20e and 20f are obtained by sampling the falling edge of each pulse of the A phase signal 10a and the B phase signal 10b at a clock input CLK. Each of these signals is fed to the OR gate circuit 21. The output signal 21a of the OR gate circuit 21 is provided at each timing of the rising edge and the falling of each of the A phase signal 10a and the B phase signal 10b as shown in FIG. 3, to be used as the trigger pulse for the latch circuits 22 through 26. The output 13a of the timer counter 13, first fed to the latch circuit 22, proceeds to the latch circuits 23, 24, 25 and then 26, sequentially at each trigger which is generated at the timing of the rising edge and the falling edge of each pulse of the A phase signal 10a and the B phase signal 10b. Both the output 22a of the latch circuit 22 and the output 26a of the latch circuit 26 are the ones which are latched at the trigger signal derived from the same phase pulse signal. Specifically, if the output 26a of the latch circuit 26 is latched at the rising edge of the pulse 10a, the output 22a of the latch 22 is also latched at the rising edge of the pulse 10a. Assuming the current latch data is 22a, the previous latch data of the same phase is 26a. The latch data 22a is fed to the data bus 18 via the gate circuit 28 at the timing of a read pulse RD4L. At the same timing, the latch data 26a is once latched into the latch 27. Then, the latch data 26a is fed to the data bus 18 via the gate circuit 29 at the timing of a read pulse RD5L.

The above-described operation is illustrated in the time chart in FIG. 3. Referring to FIG. 3, the procedure for the speed detection is described. The distance of travel of the elevator per one period of the A phase pulse signal 10a and the B phase pulse signal 10b is designated L. One full period is determined by measuring the duration between one rising edge (one falling edge) of 10a and another rising edge in succession to the first edge (another falling edge in succession to the first falling edge) of 10a, and by measuring the duration between one rising edge (one falling edge) of 10b and another rising edge in succession to the first rising edge (another falling edge in succession to the first falling edge) of 10b. Because of the use of the same phase signal, sampling of two successive rising edges or two successive falling edges as mentioned above allows stable pulse outputs to be provided, keeping them free from the effect of characteristic tolerances associated with input circuit components.

When the CPU 2 reads data at time e in FIG. 3, for example, the latest data of a count y of the timer counter 13 is the output 22a of the latch circuit 22 latched at the falling edge of the B phase signal. At this moment, the output 26a of the latch circuit 26 is the latch data x which was latched at the falling edge of one cycle earlier of the B phase signal 10b. While the timer counter 13 changes its count from x to y, the elevator box travels by L as already mentioned. Assuming that the period of the clock CLK is t, the travelling speed of the elevator box at this moment is determined as follows:

$$V = L/(y-x)t \quad (4)$$

Figure 5:
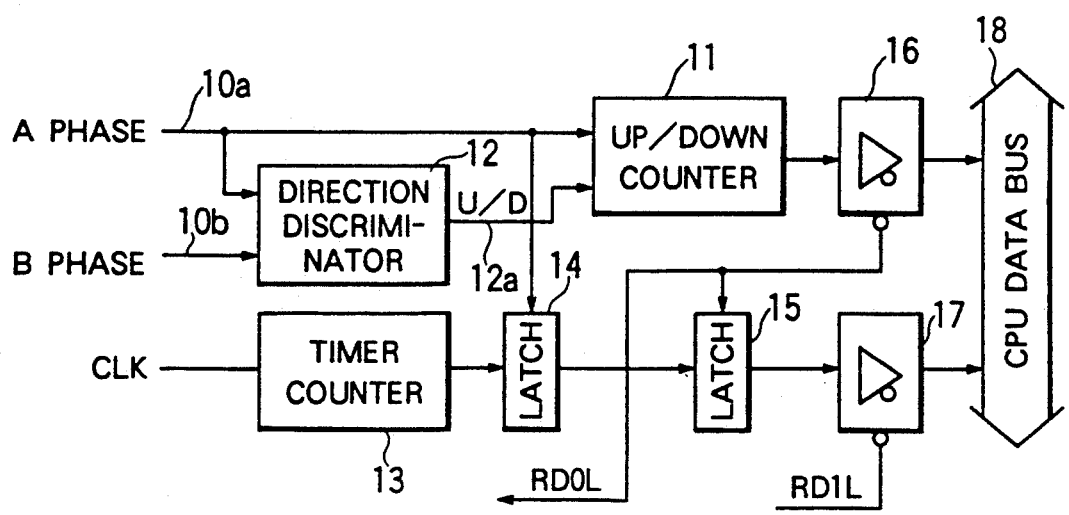
FIG. 5 is a block diagram showing the speed detector circuit of FIG. 4.
Figure 6:
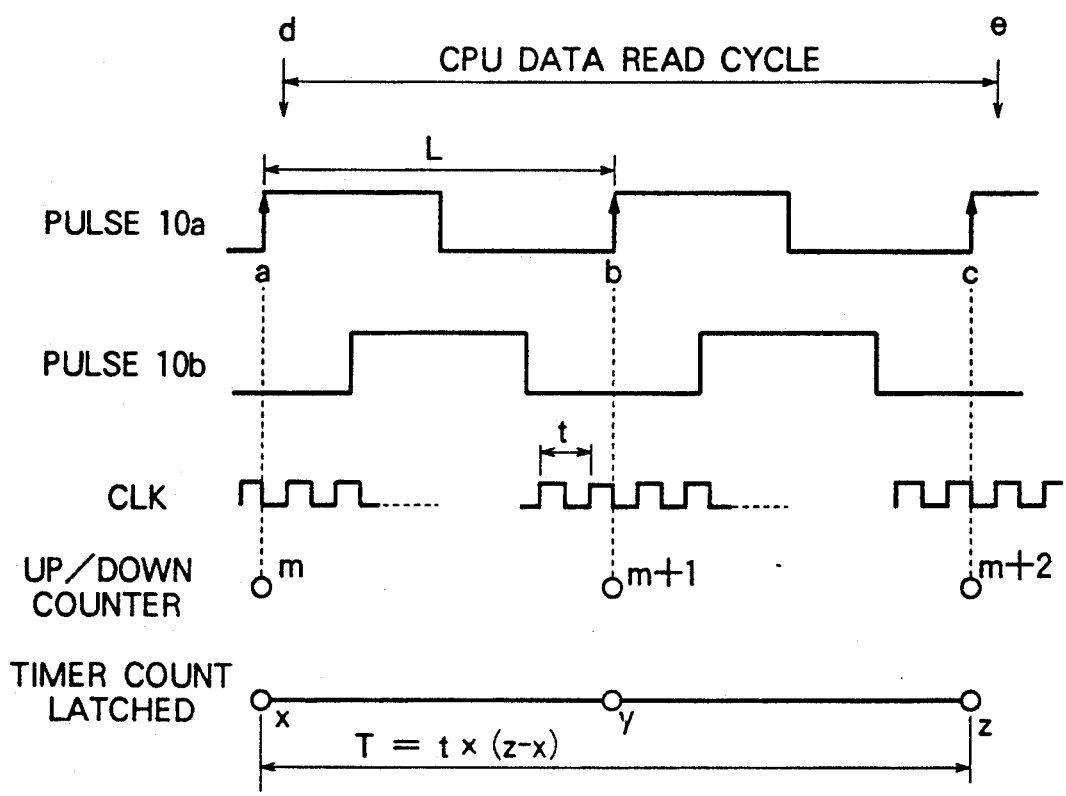
FIG. 6 is a time chart showing the operation of the speed detector circuit of FIG. 4.
Figure 7:
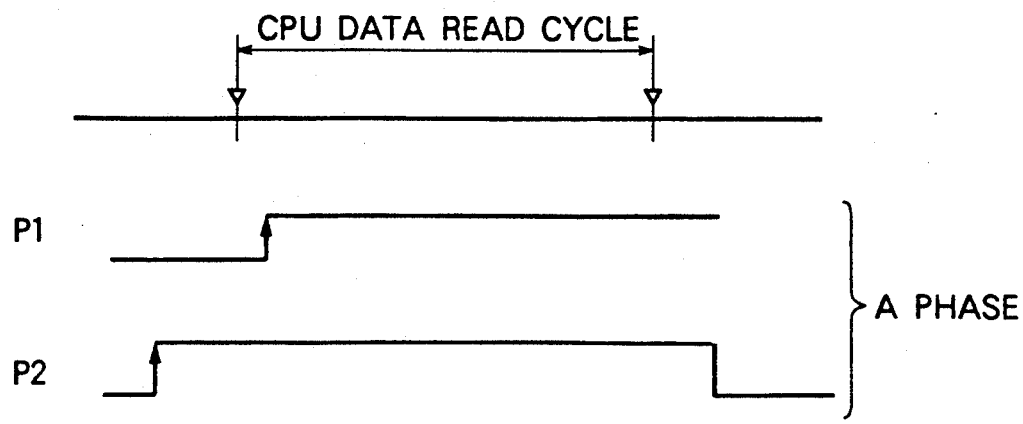
FIG. 7 is a time chart showing the operation of the speed detector circuit of FIG. 4.

By using the latest data which is provided by latching at the timing of the rising edge or the falling edge of the A phase signal 10a or at the timing of the rising edge or the falling edge of the B phase signal, in response to the CPU data read timing, and by using the previous data one cycle earlier, the full period of the pulses is calculated. For example, when the CPU 2 reads at a cycle of d-e in FIG. 3, the conventional device shown in FIG. 5 cannot detect the speed because no rising edge of 10a exists during the data read cycle. The present invention allows data to be latched not only at the rising edge of the pulse 10a, but also at the falling edge of the pulse 10a, the rising edge of the pulse 10b, and the falling edge of the pulse 10b. Thus, accurate speed measurements are achieved.

What is claimed is:

1. A speed detector device of an elevator capable of making speed measurements of the elevator in its relatively slow speed region, the speed detector comprising:
    a pulse generator generating two phase pulse signals with a predetermined phase difference between both signals, in a period corresponding to the rotational speed of a motor,
    a pulse processing circuit for outputting corresponding triggers in response to the rising edge and the falling edge of each pulse signal generated by said pulse generator,
    a timer counter for counting time,
    latch means for sequentially latching the output of said timer counter at the timing of the triggers provided by said pulse processing circuit, and
    calculating means for calculating the period of the pulse signals based on the timer counter output latched by said latch means at the timing of the triggers derived from the pulse signal of the same phase and, at the same time, for calculating the speed of the elevator based on said period.

2. A speed detector device as recited in claim 1, wherein said latch means comprises a first latch circuit through a fifth latch circuit in tandem connection, which are connected to the output of said timer counter, and all of which are simultaneously provided with the triggers generated by said pulse processing circuit.

3. A speed detector device as recited in claim 2, wherein said calculating means calculates the period of the pulse signals, based on both the output of said first latch circuit and the output of said fifth latch circuit.

4. A speed detector device as recited in claim 1, wherein said pulse generator generates two pulse signals which are 90° apart in phase with each other.

5. A speed detector device as recited in claim 1, wherein said pulse processing circuit determines the direction of the travel of the elevator based on two phase pulse signals generated by said pulse generator, and outputs an up/down signal indicative of the direction of the travel of the elevator.

6. The speed detector device as recited in claim 5, further comprising an up/down counter which detects the position of the elevator by being provided with one of the pulse signals and the up/down signal by said pulse processing circuit.

* * * * *